UNITED STATES PATENT OFFICE.

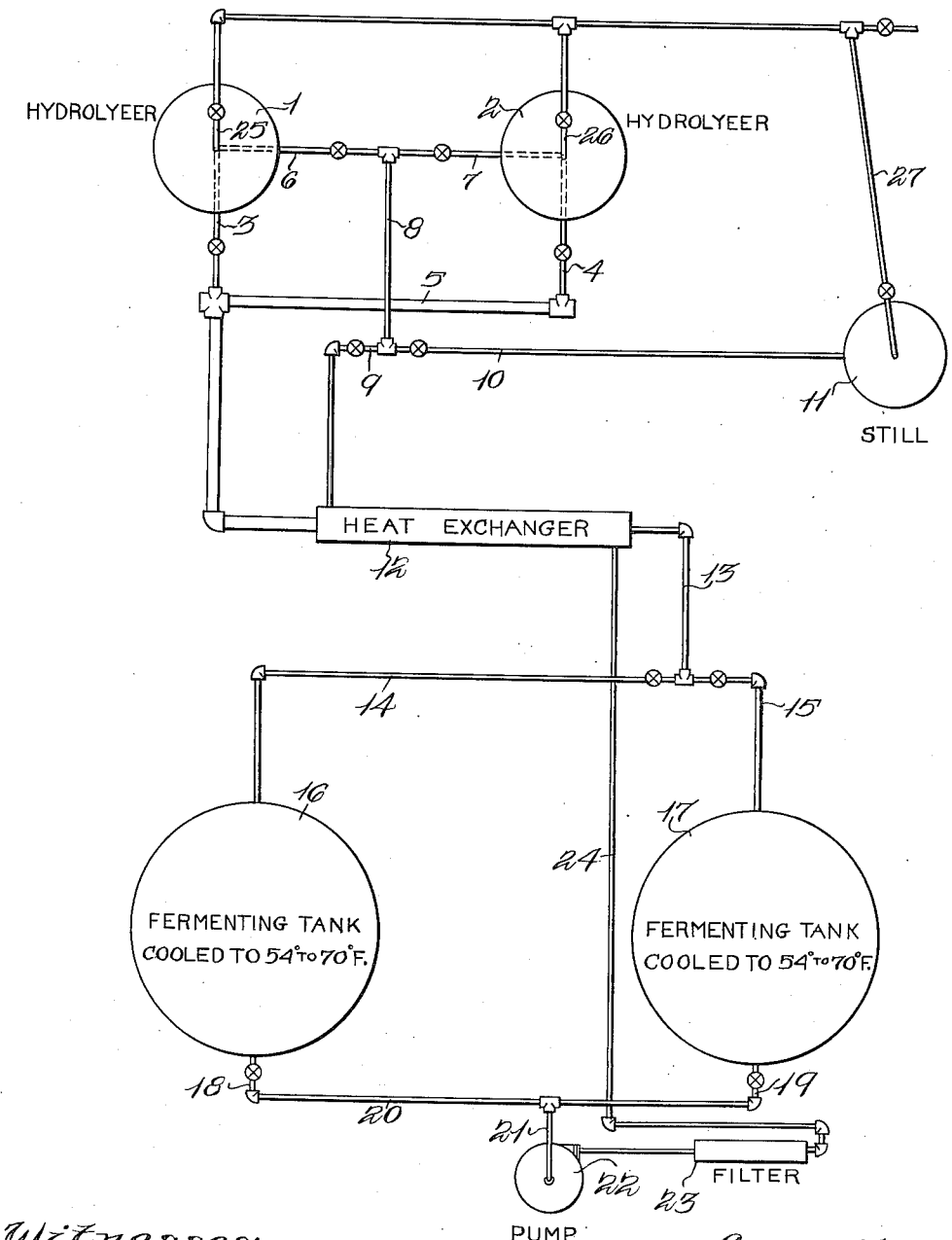

HUGH K. MOORE, OF BERLIN, NEW HAMPSHIRE, ASSIGNOR TO BROWN COMPANY, OF PORTLAND, MAINE, A CORPORATION OF MAINE.

PROCESS OF MAKING ETHYL ALCOHOL FROM WOOD.

1,323,540.　　　　　Specification of Letters Patent.　　　Patented Dec. 2, 1919.

Application filed April 23, 1914. Serial No. 833,895.

*To all whom it may concern:*

Be it known that I, HUGH K. MOORE, a citizen of the United States, and a resident of Berlin, in the county of Coos and State of New Hampshire, have invented certain new and useful Improvements in Processes of Making Ethyl Alcohol from Wood, of which the following is a specification.

The object of this invention is to manufacture ethyl alcohol from wood, first, by the hydrolysis of the raw material with the formation of fermentable sugars, second, by the fermentation of said sugars, and third, the recovery of the alcohol resulting from such fermentation.

On the accompanying drawing I have illustrated diagrammatically and conventionally an apparatus which may be used in carrying out my process.

Briefly stated, the process comprises heating the raw material in the presence of an aqueous solution of phosphoric acid or its soluble acid salts, to produce, by hydrolysis, the sugars,—*i. e.*, pentose, hexoses, etc. Then after the hydrolytic action has been continued for a predetermined period of time, the solution with its now-contained sugars, both fermentable and unfermentable, is cooled and yeast is added to cause a fermentation of the hexoses. Preferably a suitable nutritious liquor should be added to the sugar-containing solution before the yeast is supplied, in order to secure the best results. By any suitable means, after the fermentation process is completed, the resulting alcohol is distilled off or otherwise recovered.

Referring now to the drawing, I have indicated at 1, 2, two closed tanks or containers which I term the hydrolyzers inasmuch as the hydrolytic action is carried on therein. These hydrolyzers need not differ materially from the digesters which are utilized in the ordinary process of making sulfite fiber, except that they should be made considerably stronger. From the lower end of each of these hydrolyzers there are blow pipes 3, 4, each suitably valved and both communicating with a manifold 5, so that the contents of each hydrolyzer or the solution therein may be blown through the manifold. Leading to the two hydrolyzers are the pipes 6, 7, each suitably valved as indicated, said pipes communicating with a pipe 8. The pipe 8 is in turn connected with two valved pipes 9, 10, the latter leading to a column still 11 and the former leading to a heat exchanger 12. The manifold 5 is in turn connected with the interior compartment of the heat exchanger, and from said interior compartment leads a conduit 13 connected with branch pipes 14, 15, leading to fermentation tanks 16, 17. From the fermentation tanks, valved pipes 18, 19, lead to a manifold 20 from which extends a pipe 21 to a pump 22. The delivery end of the pump is connected to a closed filter 23, from the delivery end of which a pipe 24 leads back to the outer compartment of the heat exchanger 12. Leading from the top of the two hydrolyzers are the valved relief pipes 25, 26, both connected with a valve pipe 27 leading to the still 11. I have not attempted to show the various steam pipes, water pipes, cooling pipes, and the like.

Into one of the hydrolyzers, for instance 1, is placed the raw material consisting of wood chips, sawdust, or other woody material. The hydrolyzer is closed and steam is forced therethrough in either direction to carry off the pitchy, gummy or other resinous substances that may be contained in the wood. After this step has been taken, I supply to the hydrolyzer a quantity of an aqueous solution of orthophosphoric acid, $H_3PO_4$. Preferably this solution contains about three-tenths of one per cent. by weight of the acid. In lieu of using the acid named, I may employ any soluble acid-reacting salt of phosphoric acid, such for instance as monocalcium tetrahydrogen superphosphate, or its equivalent. Preferably the ratio of the volume of the solution to the raw material is about five to one where an upright hydrolyzer is used. This ratio, however, is not essential, and, when a horizontal rotary hydrolyzer is employed, only enough solution may be employed to thoroughly wet the raw material. Then, while the digester is closed, steam is injected to raise the temperature of the contents to approximately 300° F. and this temperature is maintained for about an hour, steam being injected to cause an ebullition and agitation of the mass within the hydrolyzer. During this cooking or hydrolyzing operation, the relief from the top of the digester is permitted to pass through the pipes 25 and 27 either to the open air or else to the still 11. After the cooking operation has been completed, the solution is withdrawn through the pipe 3, heat exchanger 12, the pipes 13 and 14, to one of the fermenting tanks 16, leaving in the hydrolyzer the remaining raw material. With the solution passes out such sugars as have been formed by the hydrolytic action, including the fermentable hexoses and non-fermentable pentoses, etc. During its passage through the heat exchanger, the sugar-containing solution is cooled or chilled, the fermenting tank being provided with cooling means to reduce the temperature of the sugar-containing solution to a point at which the fermentation will readily occur; say, for instance, from 54° to 70° F. Care should be taken to keep the solution to be fermented at a relatively low temperature to prevent the formation of acetic acid and other like products of fermentation. I preferably add to the solution in the fermenting tank a relatively small quantity of any nutritious liquor, such for instance as malt, barley sprouts, etc., as I find that otherwise the yeast cells will not propagate. Then I also supply to the sugar-containing solution a relatively small quantity of any suitable yeast, such as that employed in breweries, potato yeast, or the like. Fermentation soon starts and in about seventy-two hours it is complete. The solution containing the products of fermentation may now be subjected to distillation or other like process to distil off or recover the ethyl alcohol. Inasmuch, however, as the phosphoric acid in the solution has not been changed or used up, I preferably use the fermented solution, before removing the alcohol, for the hydrolysis of a second batch of raw material, and recover the alcohol from the relief gases or vapors. It may be assumed that in the meantime a second batch of raw material has been hydrolyzed in the hydrolyzer 1, and the contents are ready to be withdrawn therefrom at their high temperature, and that there has been placed in the hydrolyzer 2 a quantity of raw material which has been steamed and is ready for treatment. Now at the same time that the solution from the hydrolyzer 1 is being forced through the heat exchanger to the fermentation tank 17 through the pipe 15, the contents of the fermenting tank 16 are forced by the pump 22 through the filter 23, the pipe 24, and in the opposite direction through the heat exchanger 12, and through pipes 9, 8 and 7, into the hydrolyzer 2. As the two solutions are passing each other in the heat exchanger 12, the temperature of the solution from the hydrolyzer 1 is being reduced, whereas the solution from the fermenting tank 16 is being raised, so that the solution from the tank 16 reaches the hydrolyzer 2 at a temperature of about 280° F., and the solution from the hydrolyzer 1 reaches the fermenting tank 17 at a temperature of about 74° F. (assuming that the solution in the tank 16 was at a temperature of 54° F.). The contents of the hydrolyzer 2 are then treated as previously described, and, after the hydrolytic action is complete, the solution is withdrawn and delivered to the fermenting tank 16. During the cooking of the contents of hydrolyzer 2, the alcohol introduced therein with the solution from the fermentation tank 16 escapes with the relief gases and vapors to still 11 and is recovered.

I have shown only two hydrolyzers and two fermenting tanks, but it will be understood that these may be multiplied since it is necessary of course to employ a large number of fermenting tanks, due to the fact that the hydrolytic action takes only about one hour, whereas the process of fermentation takes about seventy-two hours.

After the raw material has been once hydrolyzed and the solution withdrawn, it may be washed and blown out into a suitable blowpit, if desired; but preferably I subject it to a second hydrolytic action. In this case, the remaining raw material, after its first treatment, is supplied with a stronger solution of phosphoric acid or the salts thereof (say 1%) and is heated to a temperature of approximately 390° F. for about an hour. After this second treatment, the solution with its contained sugars is withdrawn and fermented in the same manner as previously described. The residuum or matter remaining in the hydrolyzer is withdrawn and after being washed may be used for various purposes, or it may be thrown away as waste. After the phosphoric acid solution containing the products of fermentation has been treated by distillation for the recovery of ethyl alcohol formed by such fermentation, the residual solution may be re-used in the hydrolyzation of more raw material, but, in accordance with the process that I have described, where the acid solution containing the products of fermentation is re-used in the second hydrolyzer, the alcohol which escapes with the relief through the pipe 26 in the process of hydrolyzation is conducted to the still through the pipe 27 and such alcohol is recovered, as already stated. Thus it is not necessary with the process to carry the whole body of acid solution containing the alcohol through the still, although it can be done if desired. After a time, however, the non-fermentable sugars, such as the pentoses, accumulate to such an extent in the liquor as to interfere with the proper hydrolyzing of the raw material, whereupon after the acid solution has been finally fermented and passed through the still, the residual solution may be employed as a fertilizer.

According to the process which I have herein described, by which the same batch of material is rehydrolyzed, I hydrolyze during the first reaction approximately 22% to 25% of the weight of the dry material, and by the second reaction approximately 15% to 12% of the weight of the remainder. If, however, the first hydrolysis be discontinued when approximately 17% of the weight of the dry material has been hydrolyzed, and the second hydrolysis is conducted with a four-tenths of one per cent. of phosphoric acid solution, the total hydrolysis will be slightly less than in the first case, but the residual material will not be charred or otherwise altered to cause difficulties in the mechanical handling thereof, and this compensates for the slight loss in yield.

I have discovered that I can still further increase the yield of sugar, by oxidizing the residuum after the hydrolysis and before it is hydrolyzed a second time. For this purpose I may employ any suitable oxidizing agent such for instance as an aqueous solution of calcium hypochlorite ($CaOCl_2$). In this event, after the first hydrolyzing solution with the contained sugar has been withdrawn for fermentation, I deliver to the hydrolyzer the oxidizing solution and permit the residuum to soak therein for a short time, after which the oxidizing solution is withdrawn, and the second hydrolyzing solution is added, having previously thereto washed the residuum if desired. I find that when the residuum has been thus subjected to the action of an oxidizing agent there is a great increase in the sugar yield during the second hydrolysis, without the increased temperatures and pressures that are otherwise necessary, and without having the residuum charred.

Heretofore, so far as I am aware, it has been proposed to employ as a hydrolytic agent in the treatment of carbohydrate-containing material prior to the fermentation of the sugars, such acids as hydrochloric, sulfuric and sulfurous acids, which have necessitated the neutralization of the acids before any fermentation could be obtained. By using phosphoric acid, or the salts thereof, I am able to dispense with the step of neutralizing the acid, since I have discovered that the phosphoric acid not only does not interfere with the propagation of the yeast cells, but also aids the process of fermentation. Furthermore, the remaining raw material is not left in a slimy condition, such as results from the use of hydrochloric, sulfurous and sulfuric acids, and may be subjected to a second hydrolysis, which is not possible when the last-mentioned acids are employed. Phosphoric acid, moreover, is non-volatile, and is not carried over with the relief, or in the process of distillation. In the residual liquor, after the latter has been rendered useless as a hydrolyzer after continued re-use, the phosphoric acid still possesses its initial qualities as a fertilizing agent, and such liquor is therefore valuable as an article of commerce. Another advantage gained by the use of phosphoric acid is the ease with which it may be handled, since it does not react upon copper or materially on bronze, and hence the pipes, valves and fittings may be made of these materials which possess great tensile strength.

I claim:

1. The herein described process, comprising heating and hydrolyzing wood in the presence of an aqueous solution of phosphoric acid or soluble acid reacting salt of phosphoric acid, withdrawing the resulting solution and fermenting the sugars contained therein without previous neutralization of the acid, and recovering the alcohol resulting from such fermentation.

2. The herein described process, which comprises hydrolyzing wood under heat and pressure in an aqueous solution of phosphoric acid or soluble acid reacting salt of phosphoric acid to form sugars, subjecting the resulting solution to fermentation and thereby fermenting the hexoses to produce ethyl alcohol, and recovering the alcohol.

3. The herein described process, which consists in heating a suitable raw material in the presence of solutions of phosphoric acid or a soluble acid reacting salt of phosphoric acid, successively; withdrawing, cooling and fermenting each of the resulting acid solutions; and recovering the alcohol resulting from each such fermentation.

4. The herein described process, which comprises hydrolyzing successive charges of suitable raw material with the same aqueous solution of phosphoric acid or soluble acid reacting salt of phosphoric acid subjecting the resulting solution to fermentation after each hydrolyzation without previous neutralization of the acid, and recovering the alcohol resulting from each such fermentation during the hydrolyzation of the next successive charge.

5. The herein described process, which consists in separately heating and hydrolyzing charges of woody material with solutions of phosphoric acid or soluble acid reacting salt of phosphoric acid, cooling and fermenting each acid sugar-containing product resulting therefrom, and passing the heated unfermented sugar-containing solution and a cooled fermented solution through a heat exchanger initially to chill the unfermented solution toward a temperature for fermentation and initially to heat the fermented solution for the hydrolysis of a second charge of said material, and recovering the alcohol resulting from the fermented solutions.

6. The herein described process of making ethyl alcohol, which consists of hydrolyzing the raw material with an acid solution containing a suitable proportion of an acid which is non-retardant to fermentation, withdrawing the sugar-containing product of hydrolyzation, fermenting such product without neutralizing the acid reagent, and recovering the reagent for the hydrolysis of a second batch.

7. The herein described process of making ethyl alcohol, which consists in hydrolyzing wood material at a predetermined temperature with a phosphoric acid solution of predetermined strength, then hydrolyzing the remaining material at a predetermined higher temperature with a phosphoric acid solution of predetermined greater strength, fermenting each such product containing the reagents and the fermentable sugars, and recovering the alcohol therefrom.

8. The herein described process of making ethyl alcohol, which consists of hydrolyzing the raw material at a predetermined temperature with an acid reagent of predetermined strength, then hydrolyzing the remaining material at a predetermined higher temperature with an acid reagent of less than one per cent. strength, fermenting said reagents and the fermentable contained sugar, and recovering the alcohol formed by such fermentation.

9. The herein described process, which consists in hydrolyzing carbohydrate-containing material, treating the residuum with an oxidizing agent, and subjecting the thus-treated residuum to a second hydrolysis.

10. The herein described process, which consists in hydrolyzing wood or woody material under conditions of heat and pressure with an aqueous solution of phosphoric acid or soluble acid reacting salts of phosphoric acid, as a result of which the fermentable sugars contained in the resulting solution may be fermented without the necessity of neutralizing the acid contained in such solution.

In testimony whereof I have affixed my signature in presence of two witnesses.

HUGH K. MOORE.

Witnesses:
   Marcus B. May,
   P. W. Pezzetti.